United States Patent [19]

Papke

[11] 4,005,462
[45] Jan. 25, 1977

[54] DOUBLE SLIDE FOCAL PLANE SHUTTER
[75] Inventor: Friedrich Papke, Braunschweig, Germany
[73] Assignee: Rollei-Werke Franke & Heidecke, Braunschweig, Germany
[22] Filed: Dec. 3, 1975
[21] Appl. No.: 637,308
[30] Foreign Application Priority Data
Dec. 7, 1974 Germany .................. 2458005
[52] U.S. Cl. .................. 354/246; 354/250
[51] Int. Cl.² .................. G03B 9/20; G03B 9/08
[58] Field of Search .......... 354/245, 246, 250, 252, 354/261, 262, 265

[56] References Cited
UNITED STATES PATENTS

| | | | |
|---|---|---|---|
| 2,975,689 | 3/1961 | Chatani | 354/246 |
| 3,580,156 | 5/1971 | Loseries | 354/252 |
| 3,810,223 | 5/1974 | Kitai et al. | 354/250 |
| 3,847,476 | 11/1974 | Onda et al. | 354/252 |
| 3,903,539 | 9/1975 | Kitai et al. | 354/246 |

Primary Examiner—Donald A. Griffin
Attorney, Agent, or Firm—Ralf H. Siegemund

[57] ABSTRACT

Each slide is comprised of an exposure slit defining lamella moved on parallel swinging arms in front of the image aperture, whereby the arms overlap each other in part, as well as the lamella to provide additionally shutter functions for covering portions of the aperture which are to be covered but are not covered by the lamella in any phase of movement or position of deployment.

6 Claims, 4 Drawing Figures

DOUBLE SLIDE FOCAL PLANE SHUTTER

BACKGROUND OF THE INVENTION

The present invention relates to a double slide, focal plane shutter for photographic cameras.

Various kinds of focal plane shutters are known and a specific variety includes for example plural lamellas instead of shutter curtains whereby two particular lamellas define the slit which is to be moved across the image aperture or window for exposure of the film behind the aperture. Each of these lamellas does not cover the image aperture in its entirety so that plural lamellas were arranged in two sets, each set including one lamella having one edge to define the slit together with an edge of a lamella of the other set. The lamellas of each set in the known arrangement are disposed in a superimposing relationship and are individually controlled in one fashion or another and with regard to their position and movement. As a consequence, these known lamella shutters are quite complicated.

The reason for employing such multiple lamella type slides for shutters was that each individual lamella is not as high as the image aperture so that a set of lamellas when retracted can be aligned and forms a stack. The so aligned lamellas as covering each other occupy in that fashion an area which is smaller than the area of the image aperture and the saving in space, particularly for the retracted set of lamellas, is the main reason for using this kind of a shutter. Nevertheless, the complications with regard to moving and guiding the lamellas are a disadvantageous trade-off.

DESCRIPTION OF THE INVENTION

It is an object of the present invention to provide a new and improved focal plane shutter which is simpler than the known shutters of the multiple lamella type.

It is a specific object of the present invention to provide a focal plane shutter in which the retracted elements occupy very little space and wherein the space saving is not the result of a trade-off as to complications in the guidance and control of the shutter elements.

It is a principal feature of the present invention that the slit defining lamella of a shutter slide (there being two slides for the complete shutter) is the coupling element of at least two arms defining a parallelogram and moving the lamella across the image aperture whereby the arms themselves serve as shutter elements for covering that portion of the image aperture or window in the camera which is not covered by the lamella when deployed as well as during the phases of retraction or deployment. Therefore, in accordance with the preferred embodiment of the invention one or each of the two shutter slides is constructed as a multiple element of which one is a lamella with a slit defining edge extending across the image aperture, e.g., parallel to two of the four sides thereof. The other elements are arms which overlap in parts even when deployed and cover the remaining portion of the image aperture which (a) is not covered by the lamella and (b) is located adjacent the edge thereof opposite to the slit defining lamella edge. At least two of these arms have one end each pivotally linked to the lamella while the other ends and one end each of the other arms, if any, are pivotally linked to a stationary part of the camera. These two swinging arms, the lamella, and the pivot carrying portion of the camera define a linkage parallelogram. As the arms swing up or down for deployment or retraction of the shutter the slit defining edge of the lamella moves across the aperture without changing its orientation.

The shutter as per the invention is very light so that the mass of moving parts is quite low and that in turn permits quite short exposure periods. The invention exhibits a specific advantage that by combining the function of moving the slit defining lamella with a supplementing covering function the number of parts is reduced and that is a significant simplification.

The arms are preferably driven in unison whereby an additional interconnection of all arms obviates the need for connecting more than two arms (if there are more than two) with the lamella. The number of arms used can be optimized by choosing the arm width about equal to the width of the lamella. Under such conditions, it is possible that the retracted shutter slide covers an area smaller than the image aperture.

The position of the pivot points may vary and this is true as far as the connection of the arms to the lamella as well as the connection of the arms to the camera casing is concerned. This means that the principle of the invention and the shutter system constructed in accordance therewith is well suited for integration with the shutter drive mechanism in the camera and with the camera as a whole. By way of example, the arms may be pivotally linked (on the inside) to an outer camera wall adjacent the film, or to the plate which defines an internal partition and has the image aperture. Alternatively one can connect these arms to the carrier of the objective lens or, for example, to the so-called mirror box in a single lens reflex camera. Mass and moment of inertia of movable parts which include lamellas as well as the linkage arms, can be kept quite small if the drive for the lamella and for the arms engages more than two of the arms. This, in turn, is another feature which permits that not more than two arms need to be connected directly to the lamella. It was found that the lamella thickness may, for example, be less than 1/20 millimeter for a 35 millimeter camera.

DESCRIPTION OF THE INVENTION

While the specification concludes with claims particularly pointing out and distinctly claiming the subject matter which is regarded as the invention, it is believed that the invention, the objects and features of the invention and further, objects, features and advantages thereof will be better understood from the following description taken in connection with the accompanying drawings in which:

Figure 1:
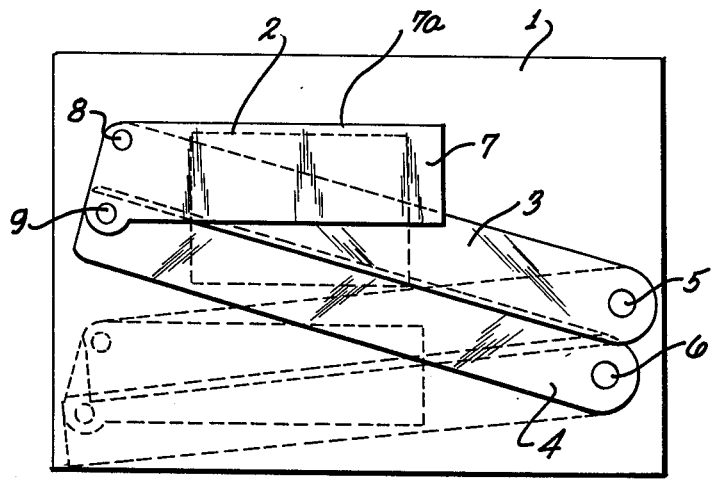
FIG. 1 is a front view of a single shutter slide having three movable elements constituting the simplest form of practicing the invention in accordance with the preferred embodiment.

Proceeding now to the detailed description of the drawings, FIG. 1 shows a plate 1 which is located inside of the camera and has as one of its functions the definition of an image aperture 2. The plate 1, therefore, is a partition inside of the camera being located between the film to be exposed and the objective lens.

A lamella 7 with an upper edge 7a is disposed in front of the aperture 2 and is held so that the edge 7a remains, for example, in horizontal disposition, i.e., parallel to the long sides of the rectangle that establishes the image aperture 2. The lamella 7 is specifically held by two parallel levers or arms, 3 and 4, respectively, which are mounted for pivot motion on or about pins 5 and 6. These pins 5 and 6 may extend from the partition wall 1, and the lower ends of the arms 3 and 4 may be provided with round bores for receiving pins 5 and 6 but the arms swing individually about the respective pins. The free ends of the arms 3 and 4 are pivotally connected to the lamella 7 by means of pins 8 and 9 which, for example, are mounted on and extend from the lamella 7 and are received by bores on arms 3 and 4 to permit complementary swinging motion.

It can thus be seen that the lamella and its two swinging arms as connected to the camera casing establish a parallelogram whose corners are defined by the pivot axes of the pins 5, 6, 8, and 9. Of course, the three flat elements 3, 4, and 7 are disposed for movement in different planes. It can be seen specifically that the oblique but downwardly projecting long edge of arm 3 overlaps the upwardly directed and also oblique and parallel edge of arm 4. On the other hand, lamella 7 overlaps arm 3.

The height of lamella 7 is considerably smaller than the height of the aperture 2, but the portion of aperture 2 not covered by lamella 7 is covered by portions of the flat arms 3 and 4. Therefore, these arms or levers combine lamella functions with guiding and moving functions for the lamella 7 whose upper edge 7a is one of the slit defining edges.

FIG. 1 shows the three element shutter slide in a deployed position covering the aperture 2 entirely. As the levers 3 and 4 swing down for any reason, for example, because they are moved down by an actuator (not shown) these levers or arms, (1) remain parallel to each other, (2) increase their overlap so that they do not form by themselves any exposure or exposing slit, (3) retain the angular orientation of pins 8 and 9 to each other (namely, parallel to the fixed pins 5 and 6), so that (4) edge 7a remains in horizontal orientation, and (5) only that portion of aperture 2 above that downward moving edge 7a can be opened up for exposure. The dash dot lines in FIG. 1 illustrate the position of the three elements for complete retraction from aperture 2. It can readily be seen here that the edge 7a has still a horizontal orientation.

A similar, three element slide is disposed, for example, above, generally speaking, and, possibly, on the other side of plate 1 and is possibly being constructed of mirror image symmetry to the three element slide illustrated. The lamella of that second slide has an edge which extends parallel to edge 7a, the exposure slit is formed and defined between them. One can also say that the lamella of the second slide follows lamella 7 but at a delay commensurate with the exposure.

It should be noted, however, that the shutter can be operated in up and down directions so that a return into a zero or cocked position is not necessary. That means that the operating edge of each of the lamellas of the two sets can be a leading or a trailing edge. Whether or not one can provide for exposure during upward as well as during downward movement for the lamella depends, of course, on the type of operating mechanism for the shutter. The shutter operating mechanism is not shown because it can be of any type. It is merely required that a movement be transmitted upon one of the arms.

FIG. 2 illustrates again an internal camera partition 11 or wall having an image aperture 12, and the shutter slide used here is composed of four elements which include three flat arms 13, 14, and 15, and a single lamella 16. The lamella 16 has also here an upper edge 16a by means of which the slit is established together with a companion lamella pertaining to a second four element slide (not shown). The arms 13, 14, and 15 are disposed at an angle that is steep as compared with the angle of arms 3 and 4 in FIG. 1 for a fully deployed disposition. Of course, arms 13, 14, and 15, as well as lamella 16, are located in different planes so that they overlap as illustrated thereby covering the aperture 2 completely, but it can also be seen that the lamella 16, in this case, has a height which is even smaller than the relative height of the lamella 7 in FIG. 1 as compared with the height of the respective image aperture.

The upper free ends of arms 13, 14, and 15 are pivotally connected to lamella 16 along the lower edge thereof. The pivots may be established by rivets 17, 18, and 19, respectively, and these rivets may be fixed to lamella 16. The lower ends of the three arms are pivoted on pins or rivets 20, 21, and 22 which are fixed to the plate 11. Any two arms establish a parallelogram linkage for and together with lamella 16; the respective plate pins complete this linkage. Since the linkage parallelogram should not be based on redundancy, at least one of the six pivots must have sufficient play to prevent binding. For example, pin or rivet 21 may be received in a slightly larger than normal slot in arm 14. Specifically, the play may be provided by a slightly oblong slot in arm 14 which receives the rivet 21 and extends towards the pivot point of pin or rivet 18 to permit a relative displacement in that direction.

The four element slide is under tension of three springs 23, 24, and 25 which have one end each connected to pins 26, 27, and 28, respectively, all being mounted on plate 11. The other ends of the springs are respectively fastened to pins 29, 30, and 31 which are secured to arms 13, 14, and 15, respectively. These pins 29, 30, and 31 traverse arcuate guide slots 35, 36, and 37, respectively, in plate 1. The other heads of these pins 29, 30, and 31 are interconnected by a bar 38. The cocking and drive mechanism as well as the release lock (not shown) engage the bar 38.

The springs 23, 24, and 25 tend to pull the pins 26, 27, and 28 back in the slots 35, 36, and 37, respectively. They are, however, prevented by a latch 33 on an arm 32 which engages a lug of arm 15 whereby the four elements are held in the deployed disposition. The latch arm 32 is provided for pivoting on pin 34. Specifically, latch arm 32 is turned counter-clockwise by operation of a release and trigger device of the camera (not shown) and as soon as this one arm 15 is released, arms 13, 14, and 15 are pivoted counter-clockwise and retracted from the aperture 2 by operation of the springs 23, 24, and 25.

Figure 2:
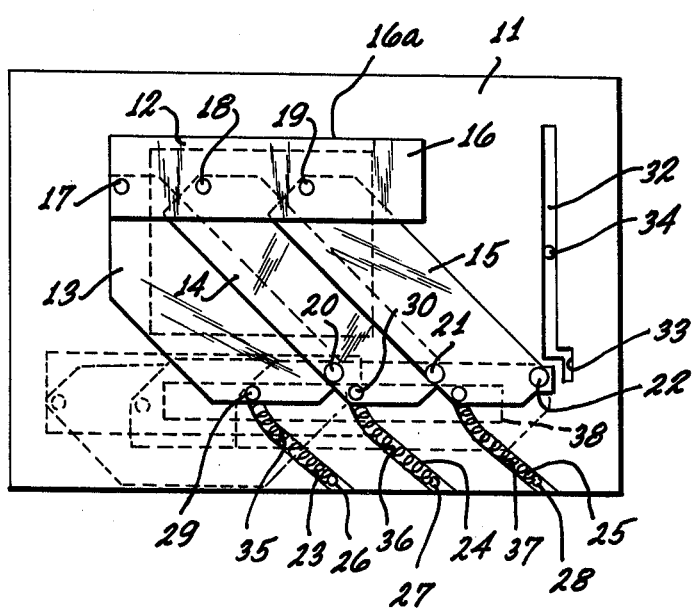
FIG. 2 is a similar front view but of a four element slide.

Upon counter-clockwise swinging of arms 13, 14, and 15, lamella 16 is retracted down across the aperture 2 and into the dash dot position of FIG. 2. The lamella and arms of the second set of shutter elements (not shown) are disposed symmetrically to the set illustrated, and this second set is possibly located on the other side of partition 11. The operation of that second set is delayed and in a manner generally known for cameras and in accordance with the selected shutter speed. The lamella of that second slide establishes the lagging edge for the exposure slot. However, it should be mentioned here that deployment of this second set (rather than retraction) is carried out by spring action. One can readily see that in the illustrated set the pins 26, 27, and 28 could also be placed above the row of pins 29, 30, and 31 so that retraction of the springs deploys the arms and swings them up.

Upon cocking the camera, the return of the slide to the respective normal position may be the result of action on bar 38 in a manner also known, per se, and is not further illustrated. Also, the release lock may engage the bar 38. Again, this is a known construction.

Figure 3:
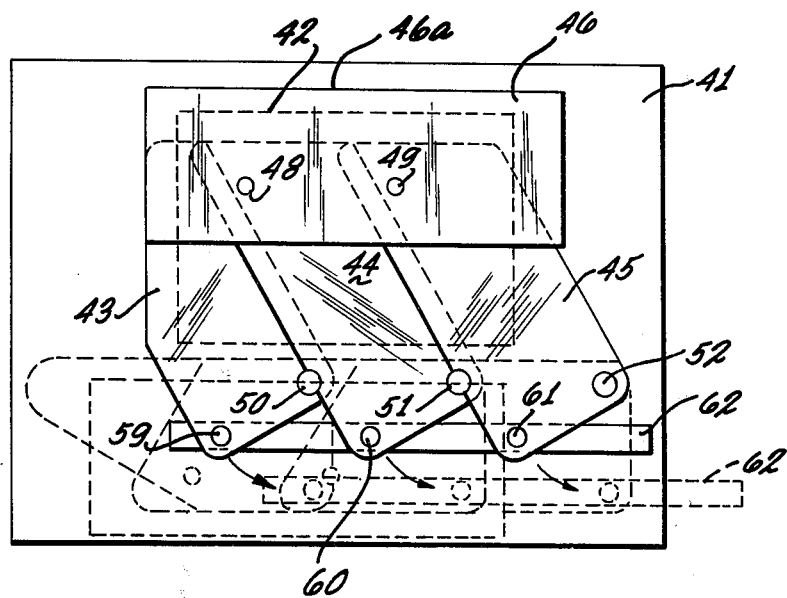
FIG. 3 is a similar front view of a single shutter slide having also four elements but being of different construction as compared with FIG. 2.

The example shown in FIG. 3 is particularly advantageous as far as compact design and saving of space is concerned. It shows also a four element slide, one lamella 46 and three arms, 43, 44, and 45, which are still steeper than the arms in FIG. 2 when in aperture closing, deployed disposition. The internal camera wall is identified here by reference numeral 41; the wall has the image aperture 42. The dash dot lines in the figure show the particular four element slide in the retracted position. The total area outlined by the dash dot lines defines the space or area covered by the retracted, undeployed slide, and this area is only about 20% larger than the area of the image aperture 42.

The two arms 44 and 45, i.e., not all of the three arms are respectively provided with round apertures to receive pins 48 and 49, respectively, on lamella 46. The lamella has, again, the exposure slit defining edge 46a. Pins 51 and 52 are mounted on plate 41 and serve as pivots for the lower end of arms 44 and 45. The third arm, 43, is only pivotally mounted on a pin 50 on plate 41 but it is not linked to the lamella 46.

All three arms, 43, 44, and 45, each have additionally an actuation pin 59, 60, and 61, respectively, which pins are pivotally interconnected by a bar 62 to compel the arms to undergo uniform movement and to provide specifically for follower movement to the arm 43. The pins 59, 60, and 61 may additionally engage springs, as was outlined above with reference to FIG. 2, and the actuation by a release trigger mechanisms, etc., may be analogously provided.

Figure 4:
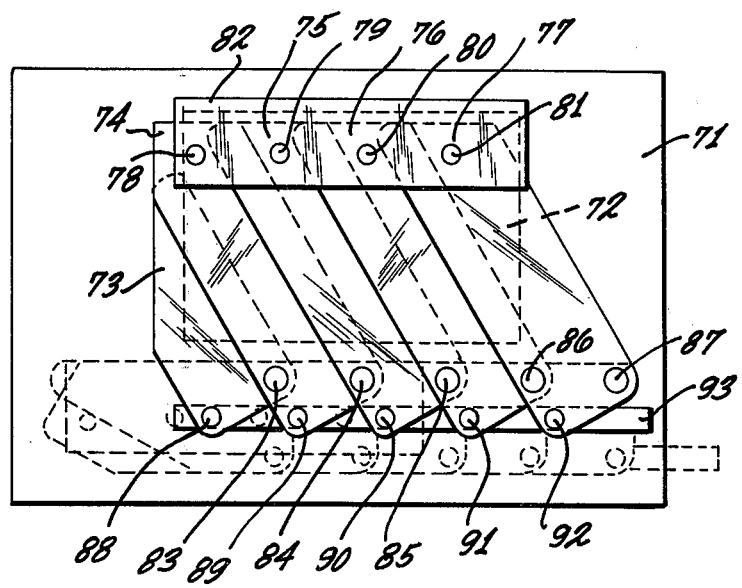
FIG. 4 is also a front view of a single shutter slide having six elements.

FIG. 4 shows a six element slide with four arms 74 to 79, respectively, pivotally connected to lamella 82 by means of pivot pins 78 through 81, which pins are mounted on the lamella. The fifth arm, 73, is a follower analogous to arm 43 in FIG. 3. The two arms 75 and 76 have rather large openings for receiving the pins 79 and 80, respectively, so that the pivot connection permits sufficient play. No such play is permitted between pins 78 and 81 on the one hand, and on 74 and 77, on the other hand, as these establish the parallelogram and the four arm linkage.

All five arms, 73 through 77, are pivotally mounted on pins 83 through 87, respectively, which are mounted and extend from the camera partition 71. The partition 71 has, of course, again, the image aperture, 72. Pins 88 through 92 are provided for connection to the drive which may include springs, etc. The pins 88, 89, 90, 91, and 92 are pivotally interconnected by a common bar 93 which compels uniform movement and actuation of all the arms. That connection to bar 93 may also be provided with sufficient play in order to avoid redundancy of the linkage parallelogram as binding must be prevented.

The five plus one element slide shown in FIG. 4 has still thinner arms and is still more compactly constructed than any of the other devices outlined above.

The dash dot lines, again, show all the elements in superimposed, retract position, and actually it was found that the area covered by the retracted and undeployed six element slide is 10% smaller than the area of the image aperture 82.

Generally speaking, a larger number of arms does not increase travel and pivotal paths of each of them, and the mass of each element is reduced. Also, the area covered by the respective slides is reduced. It was found that optimum conditions exist and are established when the arms are about as wide as the lamella. The outer, "corner" arm (43, 73) not being coupled to the respective lamella covers only that corner portion of the image aperture which is not coverable by the other obliquely positioned arms. Another parameter with regard to space occupancy of the slide elements is, of course, the minimum overlap between the arms. That, however, is related to the spacing of the planes in which the arm and the lamella move which, in turn, is determined by the accuracy of manufacture of the device.

The invention is not limited to the embodiments described above but all changes and modifications thereof not constituting departures from the spirit and scope of the invention are intended to be included.

I claim:

1. In a double slide focal plane shutter for photographic cameras, a multiple element slide disposed in front of an image aperture defined by partitioning means or the like in the cameras, the slide comprising:

a lamella covering only a portion of the image aperture in the camera, and having a slit defining edge;

a plurality of flat arms disposed in at least partially overlapping extension parallel to each other, at least two of the arms having one end pivotally linked to said lamella;

a plurality of spaced apart pivot points for pivotally mounting respectively one end of each of said arms, including the respective other ends of the said two arms, to a stationary portion of and in the camera housing, so that all of the arms being linked to the lamella operate as a parallelogram-like linkage for the lamella and the lamella is moved in front of the aperture whereby the edge retains its orientation; and the arms together and in each position covering also that portion of the aperture opposite the said slit defining edge and not covered by the lamella when in front of the aperture, whereby each of said arms covers a portion of the aperture not covered by any of the other arms.

2. In a shutter as in claim 1 all of said arms being additionally interconnected to obtain uniformity of angular movement.

3. In a shutter as in claim 1 wherein any of the arms not being pivotally linked to said lamella, and at least one of the arms being linked to said lamella, are connected to a common drive means.

4. In a shutter as in claim 3, wherein the common drive means includes an actuator rod pivotally linked to all of said arms.

5. In a shutter as in claim 1 and including a common drive means, all of said arms being additionally connected to the drive means to obtain uniformity of angular movement.

6. In a shutter as in claim 5, wherein the common drive means includes an actuator rod pivotally linked to all of said arms.

* * * * *